United States Patent
Ranegger et al.

(10) Patent No.: US 8,720,488 B2
(45) Date of Patent: May 13, 2014

(54) GAS VALVE

(75) Inventors: Gerhard Ranegger, Gleinstätten (AT); Martin Geh, Guntramsdorf (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 149 days.

(21) Appl. No.: 13/064,966

(22) Filed: Apr. 28, 2011

(65) Prior Publication Data

US 2011/0266474 A1 Nov. 3, 2011

(30) Foreign Application Priority Data

Apr. 29, 2010 (AT) .................................. A 715/2010

(51) Int. Cl.
*F16K 47/08* (2006.01)

(52) U.S. Cl.
USPC ............ 137/625.33; 137/601.03; 251/129.16; 251/129.22; 239/585.3

(58) Field of Classification Search
USPC ............ 137/601.02, 601.03, 625.28, 625.33, 137/625.37, 625.38; 251/129.12, 129.15, 251/129.16, 129.18, 129.2, 129.22; 239/585.1, 585.3
See application file for complete search history.

(56) References Cited

U.S. PATENT DOCUMENTS

| | | | | |
|---|---|---|---|---|
| 4,787,418 A | * | 11/1988 | Chute | 137/625.48 |
| 4,941,447 A | * | 7/1990 | Mannhardt | 123/455 |
| 5,398,724 A | | 3/1995 | Vars et al. | |
| 5,535,725 A | * | 7/1996 | Baker et al. | 123/520 |
| 5,782,454 A | * | 7/1998 | Bulgatz et al. | 251/129.1 |
| 6,505,112 B1 | | 1/2003 | Merminod et al. | |
| 6,991,219 B2 | * | 1/2006 | Aharonov et al. | 251/368 |
| 7,124,998 B2 | | 10/2006 | Steinruck et al. | |
| 7,178,704 B2 | * | 2/2007 | Saidman | 222/504 |
| 7,458,529 B2 | * | 12/2008 | Ricco et al. | 239/585.3 |
| 7,571,868 B2 | * | 8/2009 | Bayer | 239/585.3 |
| 8,272,399 B2 | * | 9/2012 | Farrow et al. | 137/601.02 |
| 2007/0057096 A1 | | 3/2007 | Steinruck et al. | |
| 2007/0069172 A1 | * | 3/2007 | Brenner et al. | 251/129.15 |

FOREIGN PATENT DOCUMENTS

EP 0425327 5/1991

\* cited by examiner

*Primary Examiner* — John K Fristoe, Jr.
*Assistant Examiner* — Matthew W Jellett
(74) *Attorney, Agent, or Firm* — Dykema Gossett PLLC

(57) ABSTRACT

In order to achieve high opening speeds in a dry running gas valve with electromagnetic actuation, it is provided to arrange the engagement point of the magnet armature 22 and the limit stop at the radially inner guide region 16 of the valve element 2. Due to the resulting reduced deflection, the valve element can be built more compact and lighter and the residual air gap can be reduced, which allows higher opening speeds.

12 Claims, 2 Drawing Sheets

GAS VALVE

BACKGROUND OF THE INVENTION

1. Field of the Invention

The present invention relates to a dry running gas valve having a disk-shaped valve element with a number of throughflow channels, which valve element interacts sealingly with a valve seat, and wherein the valve element is connected to a magnet armature which interacts sealingly with an electromagnet arranged in the gas valve.

2. The Prior Art

Gas valves for feeding gaseous fuel into the combustion chamber of an internal combustion engine require large opening cross-sections in order to be able to introduce enough gaseous fuel into the cylinder chamber within the short opening times available. Such gas valves are often opened by electromagnets, wherein the electromagnet has to allow a sufficient stroke and provide a sufficient magnetic force in order to be able to feed the required gas quantities within the short opening times. In addition, opening and closing times as short as possible are desired so that the time during which the gas valve can be fully open during the crankshaft cycle is as long as possible. During one crankshaft cycle which, expressed in rotation angle of the crankshaft, takes 720° for a four-stroke engine and 360° for a two-stroke engine, gaseous fuel is fed once into the combustion chamber of the internal combustion engine. For this, usually, very short times are available so that the gas valve has to open and close rapidly and has to provide a sufficient flow cross-section in order to be able to introduce the needed gas quantity within the time available. Typically, for introducing the gaseous fuel into large engines, 90° crank angle of the entire crankshaft cycle is available. Within this injection time, the gas valve has to be opened, the gaseous fuel has to be fed into the combustion chamber, and the gas valve has to be closed again. Thus, depending on the speed, only a few milliseconds, typically 10-25 ms, are available. Accordingly, the gas valve has to be capable of switching rapidly and has to provide a large opening cross-section in order to be able to feed enough gaseous fuel within these short times. Specifically in case of large gas valves for large engines, these requirements are difficult to achieve.

For this reason, similar to compressor valves, gas valves often have a disk-shaped valve element with a plurality of throughflow channels, wherein the valve element interacts sealingly with a valve seat which has a plurality of throughflow channels as well. Such a valve element typically consists of a number of concentric rings which are connected to each other by radial webs distributed over the circumference. One difference between a gas valve and a compressor valve is that a compressor valve is self-actuating whereas a gas valve is controlled, e.g. by means of an electromagnet, thus, is actively switched. While the valve element of a compressor valve is stopped at the valve catcher and rests thereon over the full surface due to the applied pressure, the valve element of a gas valve has to be stopped at a limit stop. In a compressor valve, the center pin is designed with a diameter as small as possible so as to be able to keep the available flow area as large as possible. Since, in addition, the opening force, e.g. a magnetic force, acts on the valve element of a gas valve, bending stress can occur in the valve element when resting against the limit stop which can result in that the valve element bends significantly and, e.g., abuts against the electromagnet or the flow of the gas through the valve is affected. This is in particular the case if the opening force acts centrally on the valve element, e.g. in case of an embodiment having a central pin to which the valve element is fastened and the limit stop is arranged radially on the outside. Those components which are subjected to bending therefore have to be dimensioned stronger in an adequate manner which, in turn, means more mass and slower opening and closing times. Another possibility is to select the residual air gap large enough that the valve element, despite bending, does not abut against the electromagnet. However, a large air gap reduces the effective magnetic force which either reduces the switching differential pressures and the achievable opening speeds or requires larger electromagnets, which is undesired in both cases.

An example for such a gas valve is disclosed, e.g., in U.S. Pat. No. 5,398,724 A. The valve element of this gas valve is fastened to the magnet armature by means of a central pin. Over the entire circumference of the valve element, recesses for receiving spiral springs are provided. The other ends of the spiral springs are arranged in recesses at a spring seat which also forms the limit stop for the valve element. The springs, on the one hand, generate the closing force and, on the other, guide the valve element. Since the limit stop for the valve element is provided radially on the outside, undesired bending stress is generated in the valve element.

Normally, in a compressor there is always oil in the compressed medium (e.g. air) from the lubrication of the compressor, which is why the parts of a compressor valve are also lubricated at the same time. In such a "lubricated" compressor valve, the valve element can be guided on the central center pin. In contrast, in dry running compressors, thus in case of valves without such an inherent lubrication, the valve element can not be guided centrally on the center pin due to friction and the associated wear and temperature increase. Thus, only control-arm-guided, dry running compressor valves are known in which a part of the valve element is held stationarily and said stationary part is connected via so-called control arms to the movable part of the valve element which is guided in this manner with low friction.

Also in the case of gas valves, up to now, no dry running gas valves are known in which the valve element is guided in a guide. A guided valve element for a lubricated gas valve is known, e.g. from EP 425 327 B1 in which pressurized lubricant is fed to the valve. However, this gas valve does not have a disk-shaped valve element with a number of throughflow channels, but the valve element consists here of a circular magnet armature which is connected to a vertical piston. The piston's front side facing away from the magnet armature forms the sealing which interacts with an end face of a valve seat. The piston is guided radially outwardly in a cylindrical passage of the gas valve. Due to this arrangement, the problem of the deflection of the valve element does not occur here at all.

The aforementioned U.S. Pat. No. 5,398,724 A also shows a dry running gas valve in which the guidance of the valve element takes place via spiral springs and not via guide faces.

It is an object of the present invention to provide a dry running gas valve in which the problems with the deflection of the valve element are largely avoided and high opening speeds can still be achieved.

SUMMARY OF THE INVENTION

This object is solved by the gas valve according to the invention in that the valve element is arranged such that it is mounted radially on the inside in guided manner by providing radially on the inside of the valve element a guide region with a central recess, the inner circumferential surface of which forms a guide surface and the valve element is slid with the recess onto a guide pin arranged centrally in the gas valve, the magnet armature is connected at the guide region to the valve element and a limit stop for the valve element is provided in the gas valve, which limit stop interacts with the guide region. Due to the engagement point of the magnet armature and the limit stop on the radially inner guide region of the valve element, the potential deflection of the valve element and the magnet armature is considerably reduced, whereby it is possible to design the components less massive which means, in turn, less mass to be moved and higher opening speeds. At the same time, with this embodiment, the residual air gap can be kept small whereby high magnetic forces and thus higher differential pressures, in particular without pressure compensation, can be switched and even better opening speeds can be achieved.

If in the gas valve a center part is provided in which an adjustment part is arranged such that it is mounted to be guided in an axially movable manner, wherein the adjustment part is connected at an axial end via a thread to an adjustment nut, and in a central recess in the adjustment part, the electromagnet and a first end of a spring, which interact with the valve element, are arranged then it is possible in a simple manner to adjust the stroke of the gas valve by axially displacing the adjustment part via the adjustment nut.

In order to allow a more accurate adjustment of the valve stroke, a disk spring can be arranged axially between center part and adjustment part, wherein the disk spring pretensions the adjustment part to compensate for a potentially existing axial play.

An abutment ring which, directly or via a spacer, rests axially on the valve element prevents during opening that the valve element is damaged when abutting. If, in addition, a spacer is provided between valve element and abutment ring, the residual air gap can be adjusted very accurately and in a very simple manner.

In order to reduce the frictional resistance between guide pin and valve element, a circumferential groove can be provided at the guide section of the guide pin, in which circumferential groove, a slide ring is inserted. In this manner, the opening speeds can be further increased. Advantageously, between slide ring and the base of the circumferential groove, an O-ring is arranged to tension the slide ring and to achieve a more accurate guidance.

If in the magnet armature a recess is provided which connects the volume between magnet armature and electromagnet, the achievable opening speed can be increased even further.

In order to increase the safety against leakage of the gas valve, the gas valve can be double-walled.

However, dry running gas valves have another problem, in particular in the case of absolute dry gases which can appear, e.g., when gas is evaporated from the liquid phase (e.g. in tank vessels). Since absolute dry gases have no lubricating effect, the impact stress during switching often results in cold welding between valve element and valve seat, whereby the gas valve or parts thereof can be damaged. In order to eliminate this problem it can be provided to make the valve element and the valve seat from different materials, preferably from different metals. A particularly advantageous material combination results from a valve seat made of steel and a valve element made of aluminum, optionally aluminum with an eloxal coating. However, the valve element can also be made from a suitable plastic or fiber-reinforced plastic.

The invention is illustrated hereinafter with reference to the attached drawings.

DETAILED DESCRIPTION OF THE PREFERRED EMBODIMENTS

Figure 1:
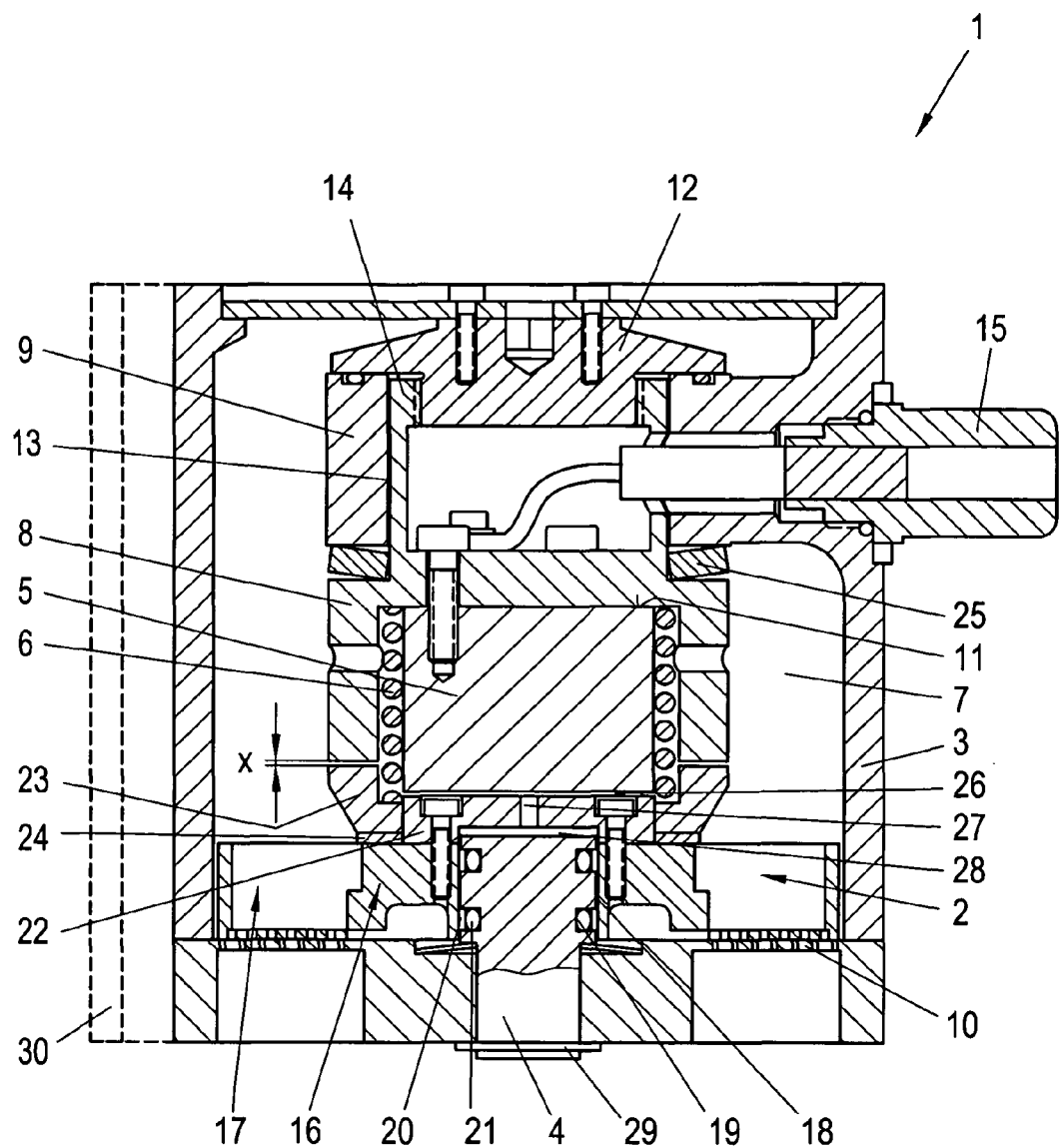
FIG. 1 shows a sectional view of a gas valve according to a first preferred embodiment of the invention.

The gas valve 1 as illustrated in FIG. 1 consists of a housing 3 in which a center part 9 is provided. At an axial end of the gas valve 1, a valve seat 10 is provided which thus forms at the same time the gas outlet opening of the gas valve 1. The valve seat can be part of the housing 3. At the opposite axial end of the gas valve 1, the gas inlet opening is provided here. Thus, the flow passes axially through the illustrated gas valve 1. Of course, it is also possible that the gas can be radially fed at a suitable position in the housing 3.

In the center part 9, an adjustment part 8 is arranged. Here, the adjustment part 8 is arranged and mounted in a guided manner in a recess 13 of the center part 9 and is retained at the axial end facing away from the valve seat 10 by a thread 14 of an adjustment nut 12. Here, the adjustment nut 12 rests axially on the axial end of the center part 9. Thereby, the adjustment part 8 is axially displaceable by rotating the adjustment nut 12 so as to be able to adjust the valve stroke in a simple manner as described in more detail below. Also, axially between center part 9 and adjustment part 8, a disk spring 25 can be arranged which pretensions the adjustment part 8 so as to compensate for a potentially present axial play, and allows a more accurate adjustment of the valve stroke.

In a central recess 11 of the adjustment part's 8 axial end facing the valve seat 10, the electromagnet 5 and a spring 6, here a spiral spring, are arranged, which, as described hereinafter, interact with the valve element 2. The spiral spring 6 is arranged radially outside of the electromagnet 5 whereby the spiral spring 6 is not limited by the available installation space in the electromagnet and therefore can be dimensioned larger and stronger, which allows higher spring forces. The supply of electric current for the electromagnet 5 can take place via a plug 15 in the housing 3 and via a recess in the center part 9.

Between valve seat 10 and adjustment part 8 with electromagnet 5 and spiral spring 6, a valve element 2 is arranged. The valve element 2 is disk-shaped and has a radially inner guide region 16 and a radially outer throughflow region 17 which has a number of throughflow channels. The throughflow region 17 can be provided, e.g., with a number of concentric rings which are interconnected by radial webs distributed over the circumference.

The throughflow region 17 should offer a flow area as large as possible to allow a gas quantity as large as possible to flow through the throughflow channels. For this it is advantageous that the throughflow region 17 is arranged radially on the outside of the valve element 2.

In the guide region 16, a central recess 18 is provided, the inner circumferential surface of which forms the guide surface for the valve element 2. For guiding the valve element 2 in the valve seat 10, a central guide pin 4 is arranged which extends axially out of the valve seat 10 and onto the free end of which the valve element 2 is slid with its central recess 18. Thus, the valve element 2 is mounted on the guide pin 4 in an axially movable and guided manner. However, the guide pin could also be an integral part of the valve seat 10. Also, in the guide section of the guide pin 4, as illustrated in FIG. 1, slide rings 20 made of triblogically advantageous material such as, e.g., PTFE, can be inserted so as to further reduce the friction between valve element 2 and guide pin 4. Between slide ring 20 and the base of the circumferential groove 19, an O-ring 21 can be inserted for tensioning the slide ring 20.

On the valve element's 2 end facing away from the valve seat 10, a magnet armature 22 is arranged which, for opening and closing the gas valve 1, interacts with the electromagnet 5. The magnet armature 22 is connected radially outside the guide pin 4 to the valve element 2, here, e.g., by screws distributed over the circumference. However, the magnet armature 22 could also be part of the valve element 2. Due to the different material requirements for magnet armature 22 and valve element 2, the latter are usually designed in two parts.

In the exemplary embodiment shown in FIG. 1, the spiral spring 6, which is arranged with one end in the recess 11 in the adjustment part 8, is arranged with the opposite end in an abutment ring 23. The abutment ring 23 rests axially on the guide region 16 of the valve element 2 and is partially arranged around the magnet armature 22 and the electromagnet 5. Also, between abutment ring 23 and valve element 2, a spacer 24 can be arranged so as to be able to adjust the residual air gap (the remaining air gap in energized electromagnets 5) to a desired value. The spiral spring 6 presses the abutment ring 23 (and thus also the valve element 2 with magnet armature 22) against the stationary adjustment part 8 towards the valve seat 10 and thus acts as closing spring for the gas valve 1. However, in doing so, the spiral spring 6 also forces the abutment ring 23 and the adjustment part 8 axially apart so that an axial distance x is generated therebetween which defines the valve stroke. By rotating the adjustment nut 12 in the adjustment part 8, the axial distance x (and thus the valve stroke) is increased or decreased. In this manner, the valve stroke can be adjusted or readjusted in a very simple and very accurate manner without the need to disassemble the gas valve.

However, it is also conceivable that one end of the spiral spring 6 is arranged directly in the valve element 2, whereby the abutment ring 23 and optionally the spacer 24 can be eliminated. In this case, the valve element 2 would rest in the open state directly against the adjustment part 8. Due to the high opening speeds, however, high abutment forces occur which could damage the gas valve 2, for which reason an abutment ring 23 is preferred.

Usually, the valve element 2 is made from a strong material, e.g. metal such as, e.g., steel or from a suitable plastic or fiber-reinforced plastic.

Also, in order to prevent cold welding between valve seat 10 and valve element 2, a suitable material combination can be selected. Preferably, different materials for the valve element 2 and the valve seat 10 are used such as, e.g., a valve seat 10 made of steel and a valve element 2 made of aluminum, optionally with a special surface treatment such as, e.g., an eloxal coating. However, the valve element 2 can also be made in combination with a valve seat 10 made of metal, a suitable plastic, or fiber-reinforced plastic.

Figure 2:
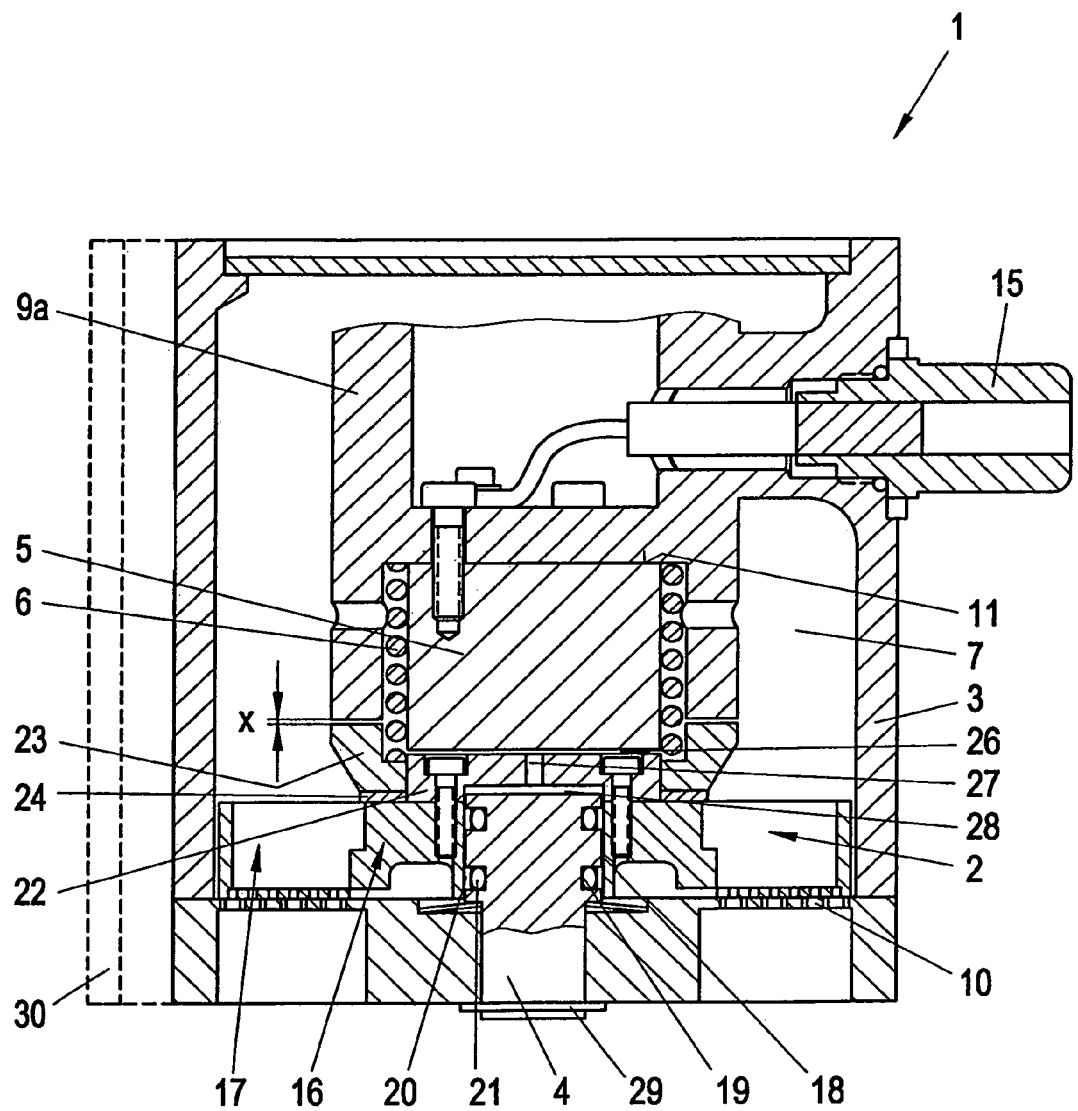
FIG. 2 shows a similar view of a second preferred embodiment.

It is also conceivable to omit the movable adjustment part 8 and the adjustment nut 12. As shown in FIG. 2, the electromagnet 5 can be arranged in the suitably formed center part 9a (which, e.g., as center part 9 and adjustment part 8, can be formed together). The adjustment of the valve stroke can then be carried out by means of different spacers between center part 9a and valve element 2 or abutment ring 23.

The above described configuration of a gas valve 1 also allows a very simple assembly and maintenance of the valve because the valve seat 10 can be removed in a very simple manner and the other parts of the gas valve 1 are then accessible from the side of the valve seat 1. For this, e.g., a snap ring 29 which fixes the guide pin 4 in the valve seat 10 has to be removed, whereupon the valve seat 10 can be removed. Of course, it is also possible to remove the valve seat 10 together with the guide pin 4.

Through the preferred arrangement of the gas inlet and the gas outlet at the axial ends of the gas valve 1 it is also possible in a very simple manner to implement a compact double-walled embodiment of the gas valve 1 in order to be able to ensure, for sensitive applications (such as, e.g., for marine applications), an increased safety against leakage. This requires simply to build a second wall 30 around the wall of the housing 3, which second wall completely surrounds the gas valve 1 (as indicated on one side in FIG. 1 with dashed lines). If the inner gas valve should become leaky, the outer wall 30 ensures that no gas can escape from the gas valve 1.

In the deenergized state of the electromagnet 5, the valve element 2 is pressed by the spiral spring 6 via the abutment ring 23 against the valve seat 10 and thus seals the gas valve 1. Once the electromagnet 5 is energized, the magnet armature 22 is retracted whereupon the valve element 2 lifts off the valve seat 10 and the gas can flow through the gas valve 1. In the fully opened state, the abutment ring 23 is going to rest against the adjustment part 8 which thus forms the limit stop for the valve element 2.

Between electromagnet 5 and magnet armature 22, a gas-filled first volume 26 forms which, when the valve opens, acts as a cushion. In order to be able to open the gas valve 1 more rapidly, a recess 27 can be provided in the magnet armature 22, e.g. a borehole axially extending through the magnet armature 22, which recess is connected to a larger venting volume 28, e.g. between the axially spaced axial ends of the guide pin 4 and the magnet armature 22. When opening the gas valve, thus, the first volume 26 is vented via the recess 27.

The invention claimed is:

1. A dry running gas valve which comprises:
   a valve seat,
   a center part spaced from said valve seat,
   an elongated adjustment part which is axially movable relative to said center part toward and away from said valve seat, said adjustment part having a first end facing said valve seat and an opposite second end, said first end defining a central recess therein,
   an adjustment nut which is threadingly connected to said second end of said adjustment part to move said adjustment part toward and away from said valve seat,
   an abutment ring movably positioned between said first end of said adjustment part and said valve seat, a spacing between said abutment ring and the first end of said adjustment part defining a stroke of the valve,
   an electromagnet located within said central recess in said adjustment part,
   a first spring positioned in said central recess and against said abutment ring to bias said abutment ring towards said valve seat,
   a central guide pin which extends between said valve seat and said adjustment part,
   a valve element having an inner guide region and an outer region, said inner guide region including a central passage that is positioned around and axially movable along said guide pin, said outer region including flow openings for cooperation with said valve seat, and
   a magnet armature located at least partially within the abutment ring and attached to said inner guide region of said valve element and cooperable with said electromagnet to move said valve element away from said valve seat and enable gas to flow through said flow openings and said valve seat, wherein during reciprocation only the abutment ring contacts the adjustment part.

2. The dry running gas valve according to claim 1, wherein said center part defines an axial passageway therethrough and said adjustment part extends through said axial passageway.

3. The dry running gas valve according to claim 1, wherein said first spring comprises a coil spring positioned around said electromagnet.

4. The dry running gas valve according to claim 1, including a second spring positioned between said center part and said adjustment part.

5. The dry running gas valve according to claim 4, wherein said second spring comprises a disk spring.

6. The dry running gas valve according to claim 1, including a spacer ring positioned between said abutment ring and said valve element.

7. The dry running gas valve according to claim 1, including a housing in which said center part is mounted.

8. The dry running gas valve according to claim 6, wherein said adjustment nut is mounted within said housing.

9. A dry running gas valve which comprises:
a valve seat,
a center part which includes a first end facing the valve seat and which defines a central recess in said first end,
an abutment ring movably positioned between said first end of said center part and said valve seat,
an electromagnet located within said central recess in said center part,
a spring positioned in said central recess and against said abutment ring to bias said abutment ring toward said valve seat,
a central guide pin which extends between said valve seat and said center part,
a valve element having an inner guide region and an outer region, said inner guide region including a central passage that is positioned around and axially movable along said guide pin, said outer region including flow openings for cooperation with said valve seat, and
a magnet armature located at least partially within the abutment ring and attached to said inner guide of said valve element and cooperable with said electromagnet to move said valve element away from said valve seat and enable gas to flow through said flow openings and said valve seat, wherein during reciprocation only the abutment rinq contacts the adjustment part.

10. The dry running gas valve according to claim 9, wherein said first spring comprises a coil spring positioned around said electromagnet.

11. The dry running gas valve according to claim 9, including a spacer ring positioned between said abutment ring and said valve element.

12. The dry running gas valve according to claim 9, including a housing in which said center part is mounted.

* * * * *